(12) United States Patent
Hofmann et al.

(10) Patent No.: US 8,388,873 B2
(45) Date of Patent: Mar. 5, 2013

(54) METHOD FOR RECYCLING ALL WASTE PLASTICS IN PARTICULAR MIXED PLASTICS

(75) Inventors: Michael Hofmann, Buxtehude (DE); Alexander Gercke, Bad Oldesloe (DE)

(73) Assignee: CVP Clean Value Plastics GmbH, Buxtehude (DE)

( * ) Notice: Subject to any disclaimer, the term of this patent is extended or adjusted under 35 U.S.C. 154(b) by 362 days.

(21) Appl. No.: 12/515,144

(22) PCT Filed: Nov. 15, 2007

(86) PCT No.: PCT/EP2007/009864
§ 371 (c)(1),
(2), (4) Date: Dec. 22, 2009

(87) PCT Pub. No.: WO2008/058730
PCT Pub. Date: May 22, 2008

(65) Prior Publication Data
US 2010/0155979 A1      Jun. 24, 2010

(30) Foreign Application Priority Data

Nov. 17, 2006 (DE) .......................... 10 2006 054 769
Nov. 17, 2006 (DE) .......................... 10 2006 054 770

(51) Int. Cl.
*B29B 17/00* (2006.01)
(52) U.S. Cl. .................................................. 264/37.26
(58) Field of Classification Search ................. 264/37.26
See application file for complete search history.

(56) References Cited

U.S. PATENT DOCUMENTS

2004/0050510 A1    3/2004  Phillips
2008/0191069 A1*   8/2008  Hofmann et al. ............... 241/15

FOREIGN PATENT DOCUMENTS

WO            2006010044 A1     9/2006

* cited by examiner

*Primary Examiner* — Larry Thrower
(74) *Attorney, Agent, or Firm* — Vidas, Arrett & Steinkraus P.A.

(57) ABSTRACT

A method for the recycling of all types of waste plastic, in particular mixed plastic (MP), in which compactate, in particular agglomerate, is ground from flakes or other plastic parts in at least one refiner stage in the presence of water, from which fine particles are removed from the ground material emerging from the refiner stage with the process water, the remaining ground material is washed and/or mechanically dehydrated and dried or the dehydrated ground material is again ground in another refiner stage in the presence of water and then dehydrated and dried, wherein the grinding of the compactate is performed in at least one refiner stage using a disk refiner (toothed disk refiner), the disks of which have engaging teeth, which are arranged separated on concentric circles, wherein there is a hole between neighboring teeth of a circle and the holes of a circle are each big enough that the particles to be ground or ground up to that point can pass through freely.

26 Claims, 7 Drawing Sheets

METHOD FOR RECYCLING ALL WASTE PLASTICS IN PARTICULAR MIXED PLASTICS

CROSS-REFERENCE TO RELATED APPLICATIONS

Not applicable.

STATEMENT REGARDING FEDERALLY SPONSORED RESEARCH

Not applicable.

BACKGROUND OF THE INVENTION

A method for the grinding and cleaning of waste plastic, in particular mixed plastic, is known from WO 2006/100044, in which a compactate or an agglomerate is produced from film shavings or other film remainders and chopped plastic parts. The agglomerate drastically reduces the volume of the waste plastic and can thus be easily transported. In this state, it is largely used for power generation. A large portion of dirt, impurities and adherences thereby remain in the agglomerate/compactate. In the known process, knowledge assumes that such a compactate or agglomerate can be easily ground and is suitable for further processing and refining. The grinding preferably occurs in a disk or drum refiner in the presence of water. A fine-particle fraction is removed from the ground material emerging from the refiner. The remaining ground material is washed or mechanically dehydrated and dried. Through further processing, such ground material can be used as a replacement for wood in composite wood boards, as a filler material in various applications and, if the degree of purification is appropriate, even with pure plastic or high-quality sorted recycling plastics for the production of plastic parts. Another area of application is the production of so-called WPC parts (wood plastic composites). During the production of such parts, a mixture of wood and plastic particles is produced either through dry mixture and direct processing or through compounding with the help of an extruder, an agglomerator, a heating mixer or a heating-cooling mixer and processed into shaped parts.

Waste plastic naturally contains a considerable share of pulp that is unusable for many purposes. This pulp originates from adhesive labels, composite packaging or from incomplete separation from free paper. In the case of plastics from waste paper collections, larger amounts of pulp often stick to the plastics. During compacting, the pulp is melted or encapsulated and thereby ends up in the grinding process.

In the case of these materials under the term compactate, one must differentiate between an agglomerate, which comes from a disk, ring die or pot agglomerator, and pellets, which are produced via a sieve mold process. Both processes compact or agglomerate the material in a dry process and create a three-dimensional composite of plastic particles with a defined particle size.

The differences between the aforementioned agglomeration processes and the pelletization processes are that a partial or even complete melting of the plastic takes place in the agglomeration processes, while no melting or only slight melting on the edge takes place in the pelletization processes using sieve molds. Another difference is that a layering of the plastics in layers takes place in the sieve mold pellets, above all in the case of plastics from films, which is not the case with the agglomerates.

However, the most important difference can be found in the aforementioned dirt and adherences. In the case of agglomerates, a large portion of the adherences, in particular pulp and dirt, is melted. In the case of sieve mold pellets, there is partial encapsulation but no melting, since the material is not melted thoroughly.

Sieve mold pellets can only be ground in an unsatisfactory manner with the process described in WO 2006/100044, since the release of individual film flakes takes place easily, which are known in the process described there to be incompletely ground or not ground at all. Only when the three-dimensional deformation of individual film flakes in the sieve mold pellets is sufficiently strong is there a satisfactory grinding result. In the case of an agglomerate that is partially or thoroughly melted, there is always an excellent grinding result according to WO 2006/100044, wherein two-dimensional flakes that are not integrated into the agglomerate but are not melted are nonetheless not optimally ground. If plastic is processed together with pulp in an extruder or in an injection molding machine, the moisture of the pulp leads to steam formation, which makes processing difficult or even impossible. Pulp in ground plastic also has the disadvantage that it attracts moisture hygroscopically and holds it longer than in the plastic material during a drying process, if applicable.

The object of the invention is to specify a method for the recycling of waste plastic, in particular mixed plastic, with which the reuse possibility of the prepared waste plastic is improved and in particular the separation of adherences and/or pulp from the waste plastic is facilitated.

BRIEF SUMMARY OF THE INVENTION

In the method according to the invention, the grinding of the agglomerate/compactate takes place in at least one refiner step, which contains a so-called toothed disk refiner. In a toothed disk refiner, the disks are provided with engaging teeth, which are arranged spaced on concentric circles. According to the invention, the hole width between the teeth of a circle is greater than the particle ground up to that point. Since the grinding of the agglomerate/compactate occurs from inside to outside and a more or less continuous reduction takes places from inside to outside, the particle is naturally considerably smaller on the radial outside than in the area of the fill opening in the axis of the refiner. Accordingly, the distance of the teeth on the circles and the distance of the grinding disks can be smaller from inside to outside. However, the named distance is very important because despite the presence of water there is also the danger that the pelletized, non-melted material gets stuck between the teeth of the refiner and plugs it up within a short period of time.

Toothed disk refiners are generally known. They are used to disperse pulp as when processing waste paper. The pulp is added to a suspension in the toothed disk refiner, wherein the material is first processed in a so-called walk zone in the infeed area before it flows to the rows of teeth. Up until now, toothed disk refiners have not been used to grind material, in particular compactates or agglomerates. In its hitherto intended use, a toothed disk refiner should separate and not grind paper fibers. The fibers should be damaged as little as possible during dispersion.

The grinding of the agglomerate/compactate using a toothed disk refiner has several advantages. It is thus possible to obtain a relatively homogenous particle mixture, which can later be processed, in particular refined, more easily. Another advantage of the use of a toothed disk refiner is that very fine grinding is possible, even with relatively tough plastics, making it easier to separate the pulp from the plastic in a later process step.

In the case of relatively loosely connected compactates, e.g. pellets from mold presses, the pulp is removed from the pellets in an effective manner using the toothed disk refiner and is then available separated from the ground plastic and can then be relatively easily separated.

A toothed disk refiner is particularly effective for plastics that are hard to compact due to higher melting temperatures in connection with higher rigidity or that are difficult to compact due to lack of connectivity to other plastics in mixed plastic fractions. Examples of such plastics are PET, PP and HDPE. In the process according to WO 2006/100044, flakes or shavings of these or similar plastics are ground insufficiently or not at all if they were not integrated into the agglomerate/compactate or the compactate was separated too soon, as can easily happen with sieve mold pellets.

Refiner disks according to WO 2006/100044 tend to have heavy wear in the areas where the barriers in the channel are arranged between the bars, since there the concentrated ground material is conveyed to the grinding zone and there are thus periods of very high grinding intensity. The grinding intensity of a toothed disk can be set considerably better than in the refiner disk described in WO 2006/100044, which leads to a considerable improvement of the grinding result and to a reduction in the wear on the grinding disks. The grinding intensity and thus the degree of fine grinding in a toothed disk refiner can be set via the number of rows of the teeth as well as the separate distance between the circles of teeth so that the toothed disk can be optimized for different ground materials and the areas of high grinding intensity are more even than in a disk according to WO 2006/100044.

It is known from the described state of the art to provide the grinding of the agglomerate in two successive refiner stages. In the case of the method according to the invention, one or both refiner stages can include a toothed disk refiner for grinding the agglomerate or compactate. The ground material from the toothed disk refiner is dehydrated according to another embodiment of the invention, preferably directly mechanically. The mechanical dehydration can take place for example using a centrifuge. Fine particles that are not needed or cannot be used in the rest of the process can be removed with the precipitated water.

A toothed disk refiner stage according to the invention can also be arranged subsequent to a common knife disk refiner for the reduction of the agglomerate/compactate. In this case, the mechanically dehydrated or dried ground material from the first disk refiner stage is added to a container with water, from which it is then added to the toothed disk refiner by means of a pump or a screw conveyor. The process water that accumulated during the mechanical dehydration can optionally undergo waste water treatment or can be fed back to the mouth of the toothed disk refiner.

It was already mentioned that a particularly good grinding of the agglomerate/compactate is enabled using a toothed disk refiner during simultaneous separation of ground or defibred pulp and plastic particles. In this connection, one embodiment of the invention provides that the mechanically dehydrated and dried ground material undergoes an air separation, in which a granular plastic fraction and a pulp/plastic fine-particle fraction are separated. The almost pulp-free plastic fraction can be used as a semi-finished product for further use in various areas of application. The pulp/plastic fine-particle fraction can also be used. This is covered below. According to one embodiment of the invention, the drying of the dehydrated ground material can take place using a fluidized-bed drier or a dispersion drier. Such driers are generally known. The pulp/plastic fine-particle fraction is preferably caught in a sieve or a filter. According to another embodiment of the invention, the filter or sieve fraction is preferably dried subsequently in another air drier, for example a dispersion drier. This measure can be important in that the plastic is already dry in the first drying stage, while the pulp, which requires a longer drying time, is still moist.

A separation of ground plastic and pulp can also take place in the wet process, e.g. through sieving, sink-float separation, sorting centrifuge or low-pressure sieving. The latter is the suctioning of the pulp suspension through a sieve using low pressure. In conclusion, a sieve device according to US 2004/0050510 A1 can also be used, wherein however the plastic forms the accept, while the pulp passes through the drum sieve.

It is important in the case of the method according to the invention that a separation of a plastic fraction is made possible almost without plastic on one hand from a pulp/plastic fraction on the other hand through corresponding grinding of the agglomerate/compactate and e.g. subsequent drying of the ground material through air separation during the drying. The amount of water in the filter material can thereby be controlled using the following parameters. One parameter is the air flow volume used for drying. Another parameter is the location where a controlled air volume is introduced or removed from the ground material. At the beginning of the drying process, it is more difficult to separate the pulp via air separation since the pulp dries slower than plastic. The separation is preferably successful at the end of the drying process when the pulp has also reached the target dryness. The degree of grinding of the material and there in particular the particle size distribution within the sieve curve is finally of importance. In the case of materials with little differences in the particle sizes, the separation of the pulp mainly depends on the weight of the individual particles and the air resistance. In the case of the distribution of the particle sizes for example in the form of a Gaussian bell curve, the fine portion together with the pulp tends to separate and the larger particles go to the plastic fraction. This effect can be taken advantage of. Fine plastics, above all of polyolefin origin, produce together with pulp a very well utilizable material for the production of so-called wood plastic composites (WPC). The plastic fiber mixture is granulated for example via an agglomerator or is distributed directly onto a double-band calender. Another possibility is the compounding for example in a special extruder with degassing device and if applicable addition of additives, such as e.g. maleic anhydride. Even pure plastics of virgin origin, reactor goods or high-quality plastics from the plastic type sorting can be added to create targeted processing qualities. In each case, a fiber tempering of the plastics is generated for this use so that the addition of wood shavings and fibers can be reduced or even omitted. The processing of wood shavings or fibers is thus omitted for the production of WPC, which leads to great economic savings. The further economic effect lies in the disposal sector, in which high costs are otherwise incurred for the disposal of the pulp.

The share of plastic in the filter or sieve fraction can be increased if the air flow in the drier is increased. Otherwise, an increase in the share of plastic during the production of a WPC compound must take place through addition of ground plastic.

The use of a conventional toothed disk, as is normally used for dispersion, is generally possible with the invention. It should be modified for reasons of optimization, e.g. to improve the grinding intensity. It requires certain modifications as can already be derived from the above information. In one embodiment of the invention, the first row of teeth is arranged at a radial distance from the infeed opening starting from the central infeed opening and forms a preferably flat inlet zone. It is provided in another embodiment of the invention that a toothed disk refiner is used, in which the distance of the disk surfaces starting from the central infeed opening continuously decreases outwards radially. The separation distance of the disks at the infeed opening is set such that the material can enter without getting stuck between the toothed disks. According to another embodiment of the invention, a toothed disk refiner can be used, in which the outer radial area of the disks has radially or almost radially spaced ribs in the direction of rotation, like knife disk refiners have, as they have also become known for the grinding of plastic agglomerate. In this connection, the grinding ribs can be provided with barriers such that the ground particles are steered towards the neighboring disk.

In conclusion, a toothed disk refiner can be used, in which channels, which extend outwards for a certain distance, are formed in the toothed disks starting from the middle inlet in circumferential distance. The channels, the depths of which can decrease from inside to outside, are so wide in each case that they enable the entry of the compactate.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
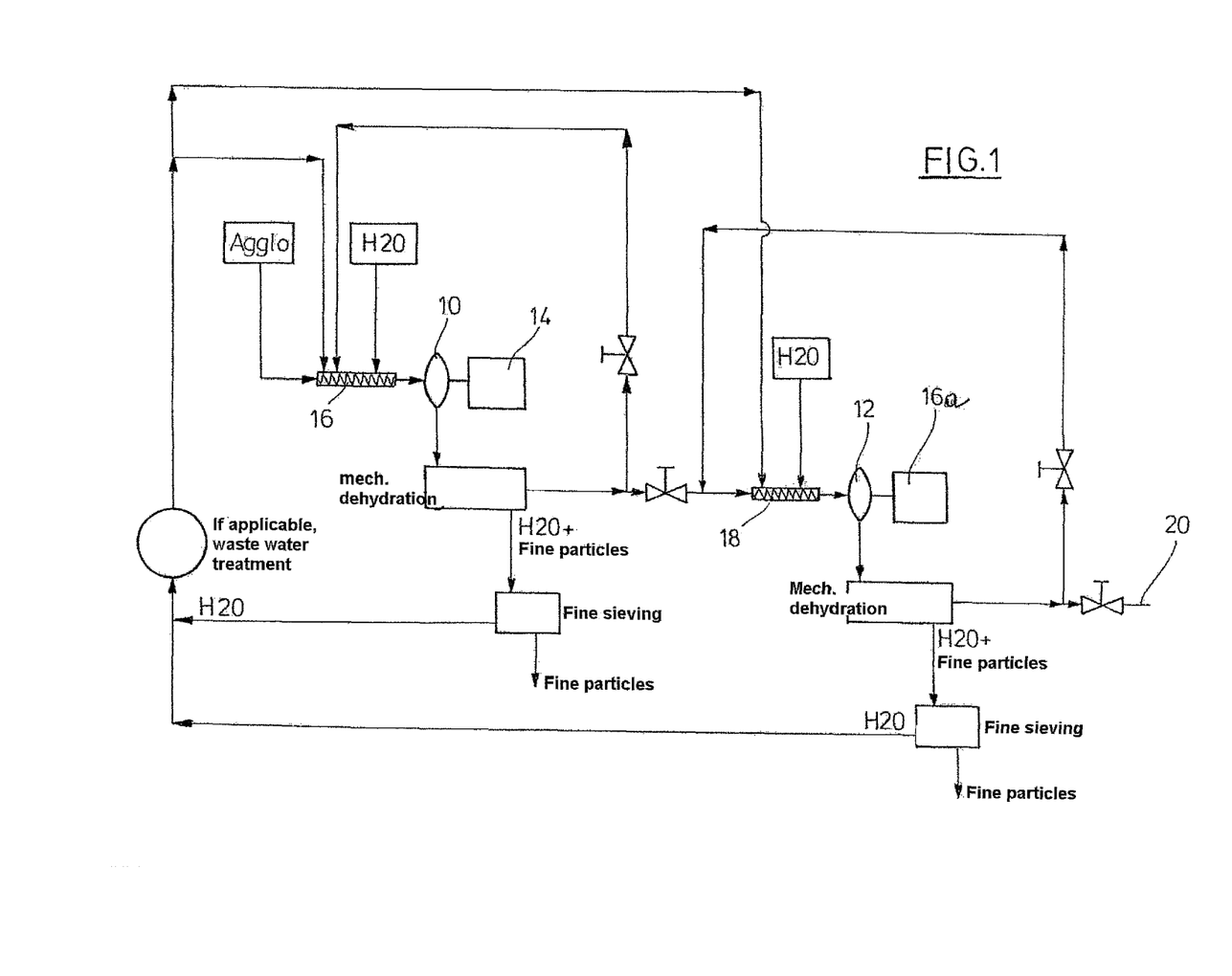
FIG. 1 shows a systems diagram for the processing of agglomerated mixed plastic in two subsequent refiner stages.

FIG. 1 shows a first refiner 10 and a second refiner 12, which are driven respectively by a drive motor 14 or 16a. The refiners 10, 12 are so-called toothed disk refiners, as will be described in greater detail. From a reservoir (not shown), a plastic agglomerate or compactate, previously produced from plastic flakes and similarly sorted plastic waste, which is generally known, is fed to a screw conveyor 16, to which water is also added. The suspension of water and plastic agglomerate or compactate is added to the toothed disk refiner 10. The grainy ground material is dehydrated in a mechanical dehydration, for example using a centrifuge. Process water with small particles arrives in a fine sieve, in which the fine particles are separated from the process water. The fine particles have a particle size of 0.25 mm or 0.5 mm or less. The process water goes to waste water treatment and from there back to the screw conveyor 16. The dehydrated, ground material goes to another screw conveyor 18 together with supplied process water. If applicable, fresh water is also added to the screw conveyor 18. In the second refiner, the ground material is further ground and separated from process water and fine particles in a mechanical dehydration, for example in a centrifuge. After fine particles have in turn been removed, the process water can be conveyed to a waste water treatment. The dehydrated ground material goes from the outlet of the stage shown in FIG. 1, as specified by number 20, to a drying stage.

The ground material from refiner 10 can also be fed directly back to its inlet or the screw conveyor 16, e.g. with a volume share of 30%. A return can be provided for each refiner stage, as is also shown e.g. in FIG. 2 through 4.

Figure 2:
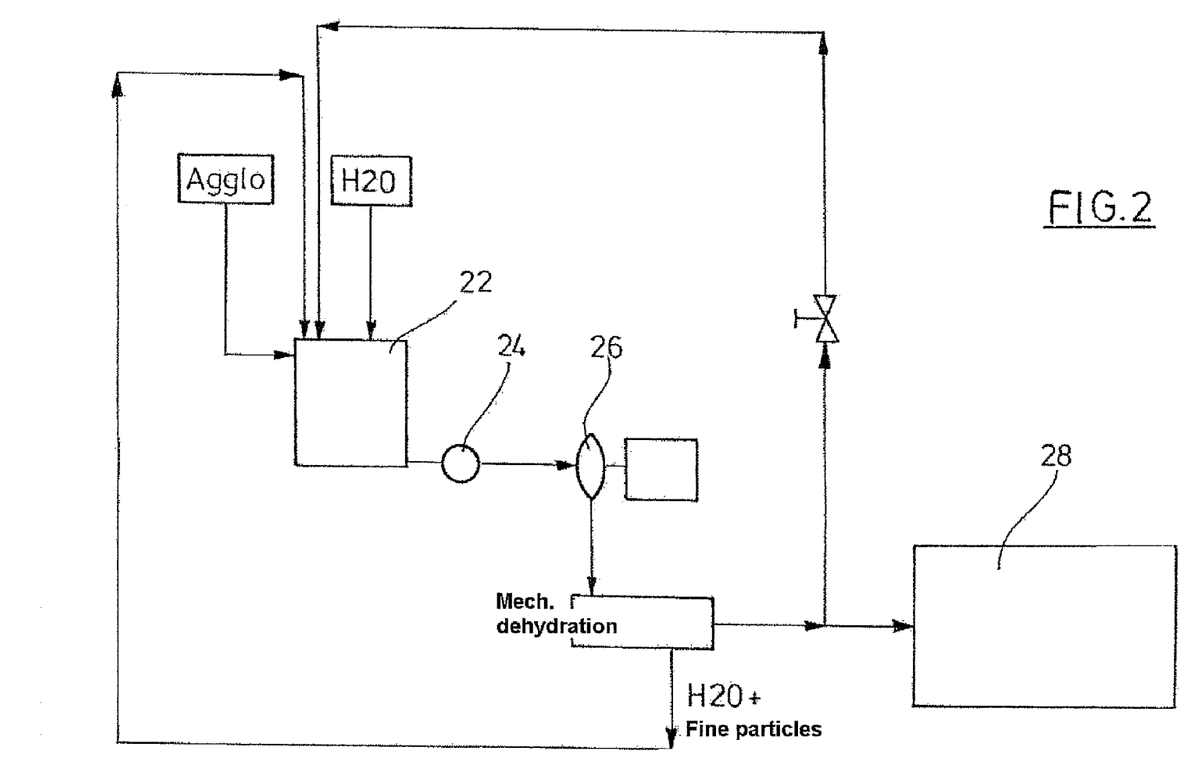
FIG. 2 shows a refiner stage with a toothed disk refiner according to the invention as a preliminary stage before an already known processing process for a plastic agglomerate.

In the case of the embodiment according to FIG. 2, plastic agglomerate or compactate is added together with water to a container 22, wherein the solids content is at least 10%. This mixture is added to a toothed disk refiner 26 via a solids pump 24. The ground material is mechanically dehydrated, for example using a centrifuge. The process water with fine particles can be fed back to the container 22. Optionally, the fine particles can also be sieved. The dehydrated ground material goes to another processing stage 28, for example a stage as described in detail in WO 2006/100044.

Figure 3:
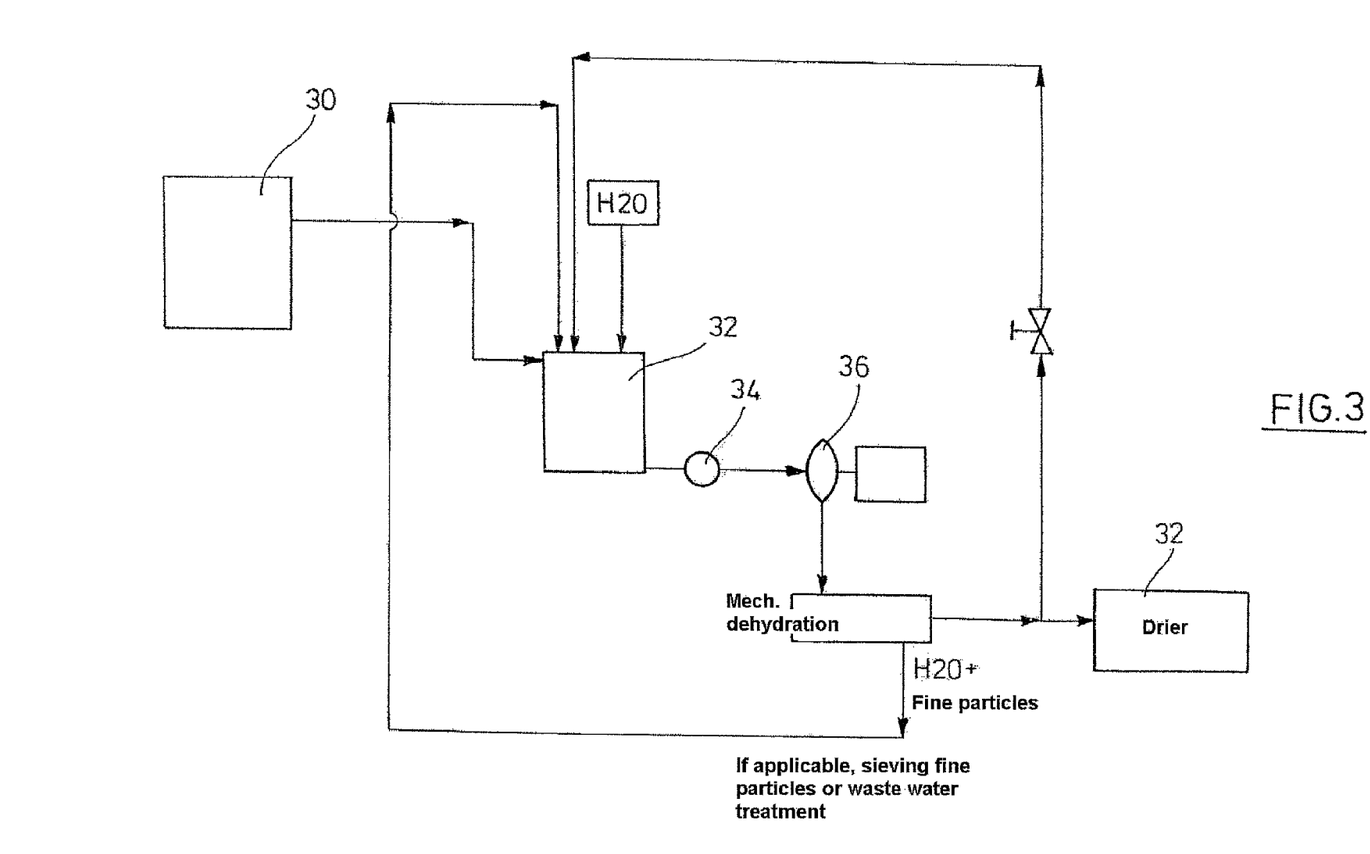
FIG. 3 shows the same refiner stage according to FIG. 2 subsequent to a conventional grinding process for a plastic agglomerate.

In the embodiment according to FIG. 3, ground material, which is produced for example using a disk refiner, is dried in a drier 30. The drier 30 can thereby be circumvented, whereby the dehydrated ground material of the preceding refiner stage is fed directly to the container 32. The material is added to the container 32 with process water, wherein the solids content in turn is at least 10%. The mixture is added to a toothed disk refiner 36 via a solids pump 34, in which grinding to an even finer-particle material takes place. The ground material is mechanically dehydrated and fed to a drier 32. Process water with fine particles, which are removed if applicable, can be fed to a waste water treatment or back to the container 32.

Figure 4:
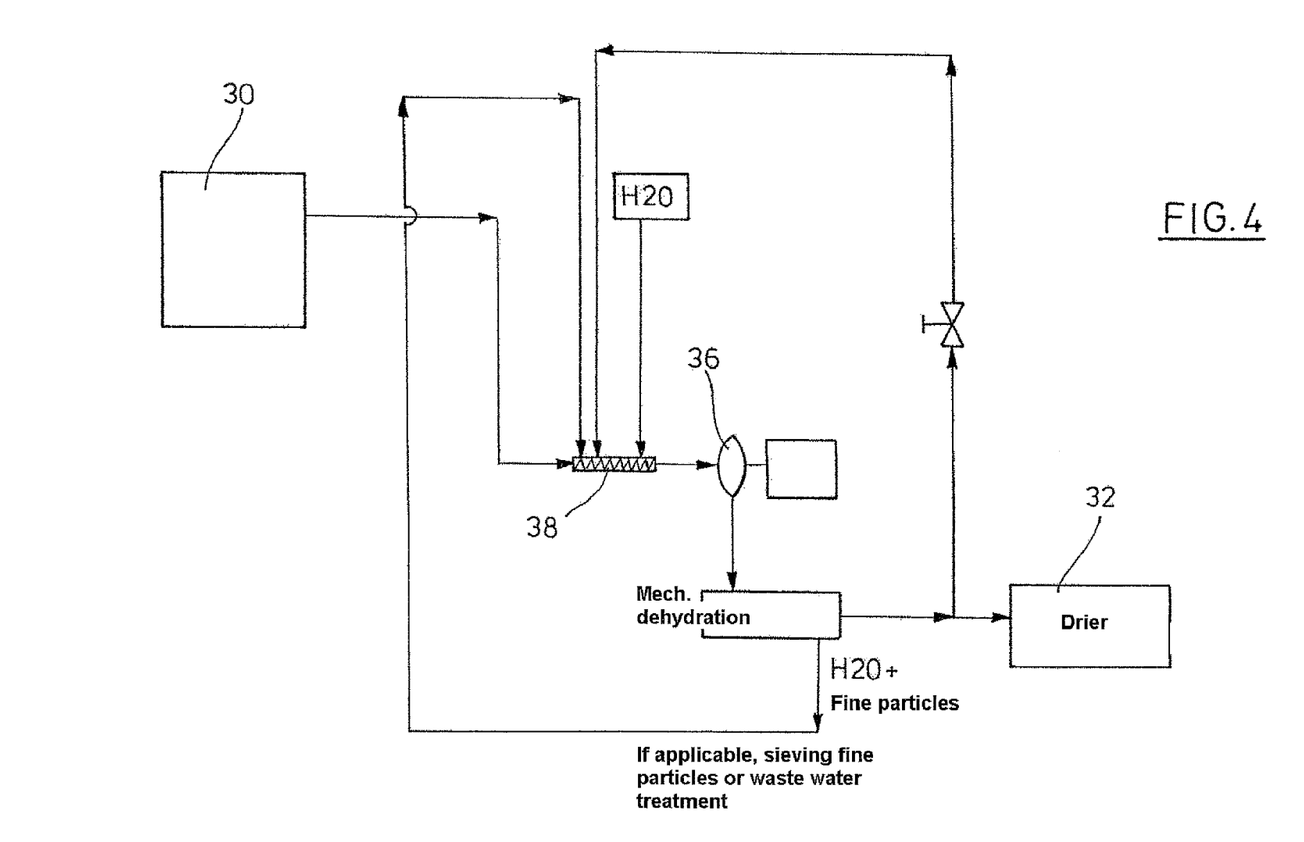
FIG. 4 shows a representation similar to FIG. 3 with a slight modification.

The embodiment according to FIG. 4 is only different from that according to FIG. 3 in that no water container 32 is used; instead, the material is added to a screw conveyor 38 together with process water.

Figure 5:
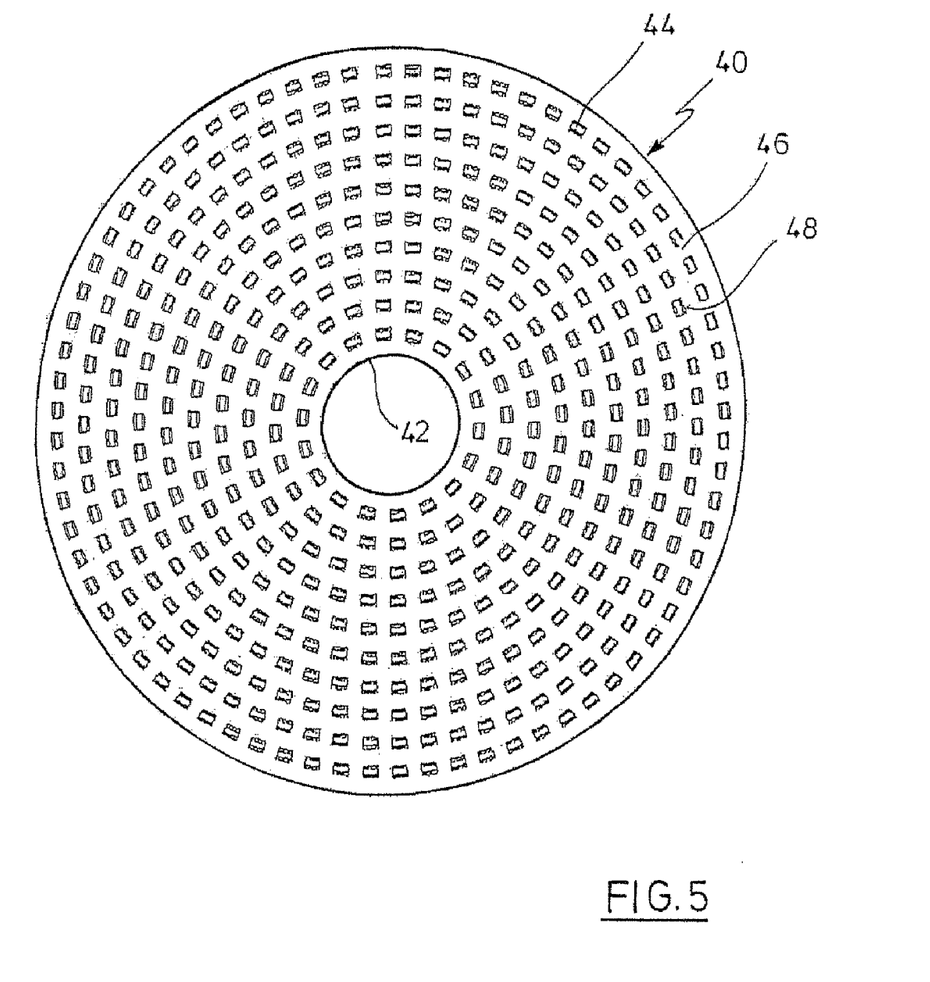
FIG. 5 shows the view of the top of a disk of a toothed disk refiner for use in the invention.

FIG. 5 shows a view of the top of a disk 40 of a toothed disk refiner, as can be used for the grinding of agglomerate/compactate. In this case, it is the disk of a toothed disk pair, over the middle opening 42 of which material to be ground is introduced. Teeth 44 are formed on the disk 40 in ten circles, which are arranged centrically. The disk 40 is flat between the teeth 44. The teeth, which can have different shapes, each have on a circle a separation distance 46, which in this case is almost the same, but which can decrease from inside to outside. Between the circles, the teeth have a separation distance 48. This can also become smaller from inside to outside. During the grinding process, water and material to be ground, compactate or agglomerate, arrive at the area between two opposite toothed disks via opening 42, wherein the tooth arrangement of the second disk, which is not shown in FIG. 5, is arranged such that the rows of teeth can interconnect. The distances 46, 48 and the distance of cooperative toothed disks is measured such that the respective material to be ground can pass through unhindered so that blockages are avoided. For this reason, the distances 46, 48 as well as the distance between cooperative toothed disks can decrease from inside to outside, because the particles of the material are reduced from inside to outside.

Figure 6:
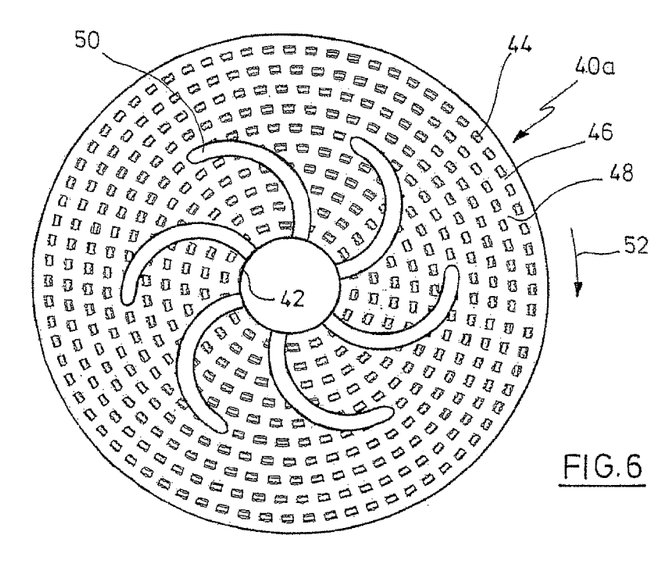
FIG. 6 shows a modification of the toothed disk according to FIG. 5.
Figure 7:
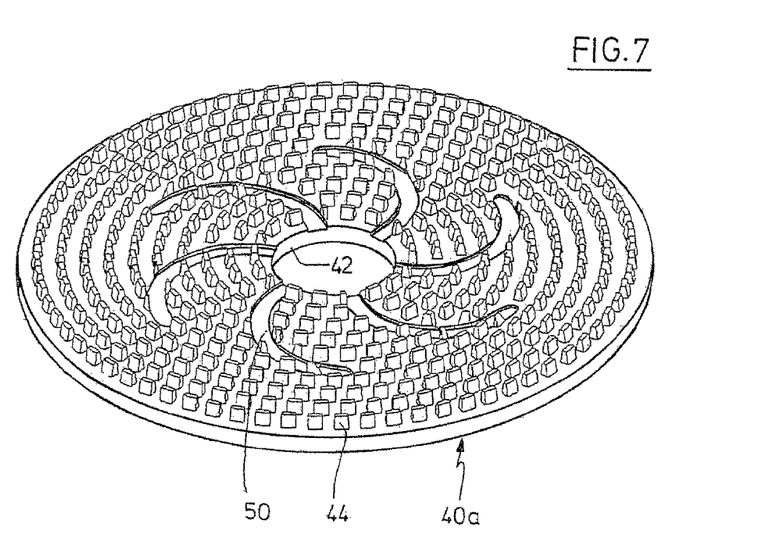
FIG. 7 shows a perspective view of the toothed disk according to FIG. 6.

The toothed disk 40*a* according to FIG. 6 is different from that according to FIG. 5 in that several channels 50 are formed starting from the infeed opening 42. The channels have an almost circular arc shape, wherein the curvature is such that the ends of the channels 50 are opposite the direction of rotation, which is shown with arrow 52. The channels 50 have a width, which is slightly or somewhat larger than the width of the largest agglomerate/compactate particles fed in through the infeed opening 42. If on the other hand the material to be ground is not an agglomerate or compactate but rather an already ground agglomerate/compactate, the width of the channels 50 should be correspondingly smaller. The channels 50 have the greatest depth adjacent to the infeed opening 42 and gradually decrease in depth, wherein they run into the toothed disk surface on the end.

Figure 8:
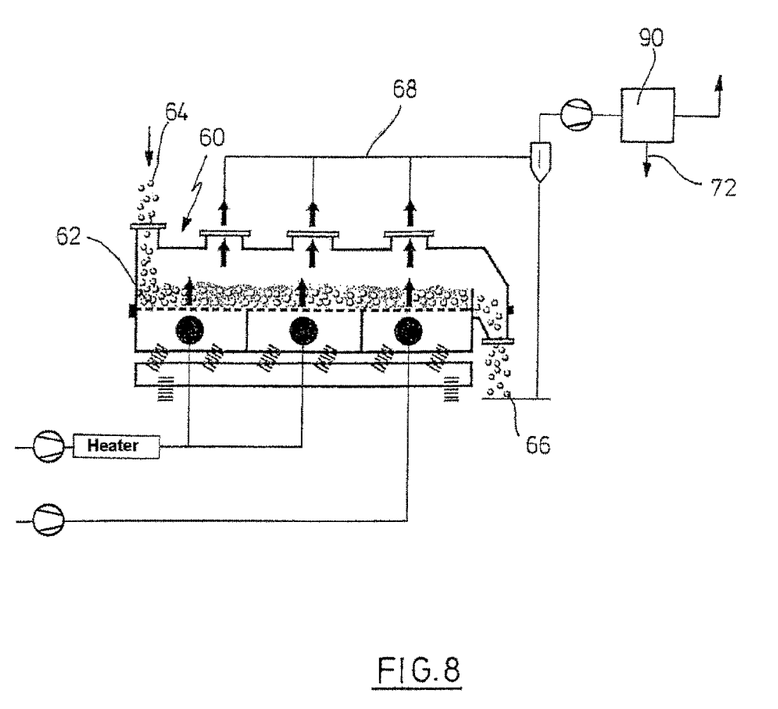
FIG. 8 shows a schematic illustration of the drying and air separation at the end of the grinding process of a plastic agglomerate.

FIG. 8 shows a schematic illustration of a fluidized bed drier, as can be used at connection 20 of the embodiment according to FIG. 1 or for the drier 32 according to FIGS. 3 and 4. It is shown overall with 60. The longish housing is divided in the longitudinal direction by a sieve or grill 62, which holds the ground material 64 added above. Warm air from a heater is introduced below the sieve 62. Cold air is introduced in the last third. The longish housing vibrates in a suitable manner so that the material as a bed on sieve 62 moves forward from left to right. This type of fluidized bed drier is generally known. The dried material makes its way out of the housing of the fluidized bed drier at 66 on the right end. The drier shown also serves as an air separator. The ground material 64 contains grainy plastic and pulp. The pulp is conveyed together with potentially still adhering, very fine plastic particles to a sieve or filter 70 via line 68, where pulp and plastic are collected. The sieve fraction is conveyed via 72 for further processing, if applicable after further drying via a dispersion drier. Further processing takes place for example in the production of WPC shaped parts. The dried, pure plastic ground material can be conveyed to further processing directly or after further sorting, for example by particle sizes.

The invention claimed is:

1. A method for recycling of all types of waste plastic, in which agglomerate or compactate, from flakes or other plastic parts are ground in at least one refiner stage in the presence of water, to form ground material emerging from the at least one refiner stage; from at least a portion of the ground material emerging from the at least one refiner stage, fine particles are removed with the water, the remaining ground material is washed and mechanically dehydrated and dried and, optionally, the dehydrated ground material is again ground in another refiner stage in the presence of water and then dehydrated and dried, characterized in that the grinding of the agglomerate or compactate is performed in the at least one refiner stage using a disk refiner having two disks, the disks of which have engaging teeth, which are arranged separated on concentric circles, wherein there are gaps between neighboring teeth of the concentric circles and the gaps of the concentric circles are each big enough that the agglomerate or compactate to be ground can pass freely through the gaps.

2. The method according to claim 1, characterized in that the grinding takes place in two subsequent refiner stages, and in the first and/or second refiner stage a tooth disk refiner is used.

3. The method according to claim 1, characterized in that the ground material from the toothed disk refiner stage is mechanically dehydrated before drying.

4. The method according to claim 1, characterized in that mechanically dehydrated or dried ground material of a second refiner stage is added to a container with water, from which it fed into a toothed disk refiner by means of a pump or as dehydrated material through addition of water with a screw conveyor.

5. The method according to claim 1, characterized in that fine particles accumulated during mechanical dehydration with process water either undergo waste water treatment.

6. The method according to claim 2, characterized in that ground material directly emerging from a toothed disk refiner is mechanically dehydrated and then fed to another refiner stage, with subsequent mechanical dehydration and drying of the ground material of the second refiner stage.

7. The method according to claim 1, characterized in that the grinding in a first or second refiner stage is so fine that plastic and pulp particles form a mixture of separated particles and the mechanically dehydrated and dried ground material undergoes an air separation, in which a grainy plastic fraction and a pulp/plastic fine-particle fraction are separated.

8. The method according to claim 7, characterized in that the dehydrated ground material is dried using a fluidized bed drier or a dispersion drier and the pulp/plastic fine-particle particles transported away with the drying air are caught in a sieve or a filter, forming a filter or sieve fraction.

9. The method according to claim 7, characterized in that the portion of plastic particles carried away is changed by changing the dry air flow.

10. The method according to claim 8, characterized in that the filter or sieve fraction is dried subsequently in another air drier, for example a dispersion drier.

11. The method according to claim 1, characterized in that the grinding is so fine that plastic and pulp particles form a mixture of separated particles and the mixture is separated into a grainy plastic fraction and a pulp/plastic fine-particle fraction through sieving, sink-float separation, sorting centrifuge or low-pressure sieving.

12. The method according to claim 1, characterized in that in the used disk refiner, starting from a central infeed opening, a first tooth circle for the formation of an inlet zone is arranged at a radial distance from an infeed opening.

13. The method according to claim 12, characterized in that the disk surface of the inlet zone is continuously flat until the first tooth circle.

14. The method according to claim 1, characterized in that a toothed disk refiner is used, in which the distance of the disk surfaces starting from a central infeed opening continuously decreases radially outwards.

15. The method according to claim 1, characterized in that a toothed disk refiner is used in which a radially outer area of the disks comprises radial or almost radial grinding ribs separated in the direction of rotation.

16. The method according to claim 15, characterized in that barriers are arranged between the grinding ribs such that the ground particles are steered towards the neighboring disk.

17. The method according to claim 1, characterized in that a toothed disk refiner is used, in which, starting from a middle infeed opening, channels are formed in the toothed disks in circumferential distance of the middle infeed opening, which extend outwards for a certain distance.

18. The method according to claim 17, characterized in that the depth of the channels decreases from inside to outside.

19. The method according to claim 17, characterized in that the channels are curved, wherein the outer end of the curved channels points opposite the direction of rotation.

20. The method according to claim 1, characterized in that the ground material freed from the pulp is sorted by particle size and/or specific weight.

21. The method according to claim 20, characterized in that the sorting takes place in a sorting centrifuge or a hydrocyclone.

22. The method according to claim 7, characterized by the use of the pulp/plastic fine-particle mixture for the production of wood plastic composites.

23. The method according to claim 22, characterized in that a grit is formed or granulated from the pulp/plastic fine-particle mixture, if applicable through addition of wood or pulp fibers or other plastics.

24. The method according to claim 22, characterized in that the pulp/plastic fine-particle mixture is compounded in an extruder.

25. The method according to claim 1, wherein the waste plastic is mixed plastic.

26. The method according to claim 1, wherein the agglomerate or compactate are sieve mold pellets.

* * * * *